United States Patent [19]
Harrell et al.

[11] 3,818,319
[45] June 18, 1974

[54] REGULATOR TURN-ON OVERSHOOT ELIMINATION

[75] Inventors: John W. Harrell, Duncanville; Bobbie J. Patton, Dallas; James H. Sexton, Duncanville, all of Tex.

[73] Assignee: Mobil Oil Corp., New York, N.Y.

[22] Filed: Mar. 14, 1973

[21] Appl. No.: 340,989

[52] U.S. Cl.................... 322/28, 307/105, 307/108, 322/36
[51] Int. Cl. ............................................ H02p 9/30
[58] Field of Search ............. 322/18, 28, 36; 320/1; 323/22 SC; 307/10 S, 108, 109; 321/10; 318/449

[56] References Cited
UNITED STATES PATENTS
3,243,689   3/1966   Perrins ........................... 323/22 SC
3,525,924   8/1970   Atterholt ......................... 322/36 X Primary Examiner—Gerald Goldberg
Attorney, Agent, or Firm—A. L. Gaboriault; William J. Scherback

[57] ABSTRACT

A variable current generator supplies charging current to the feedback filter capacitance during the startup of the regulated voltage generator. The variable current generator is controlled by an auxiliary charging circuit which acts to rapidly charge the capacitance in the feedback filter. This prevents overshoot in the output of the voltage generator upon startup due to a time lag between the voltage at the output of the alternator and the voltage at the input of the feedback amplifier. This time lag is otherwise caused by the time required to charge the capacitance in the feedback filter. However, the auxiliary charging circuit and variable current generator of this invention charge the capacitance thereby eliminating the time lag and preventing overshoot. A circuit turns off the current generator when the output of the alternator reaches its regulated value.

5 Claims, 6 Drawing Figures

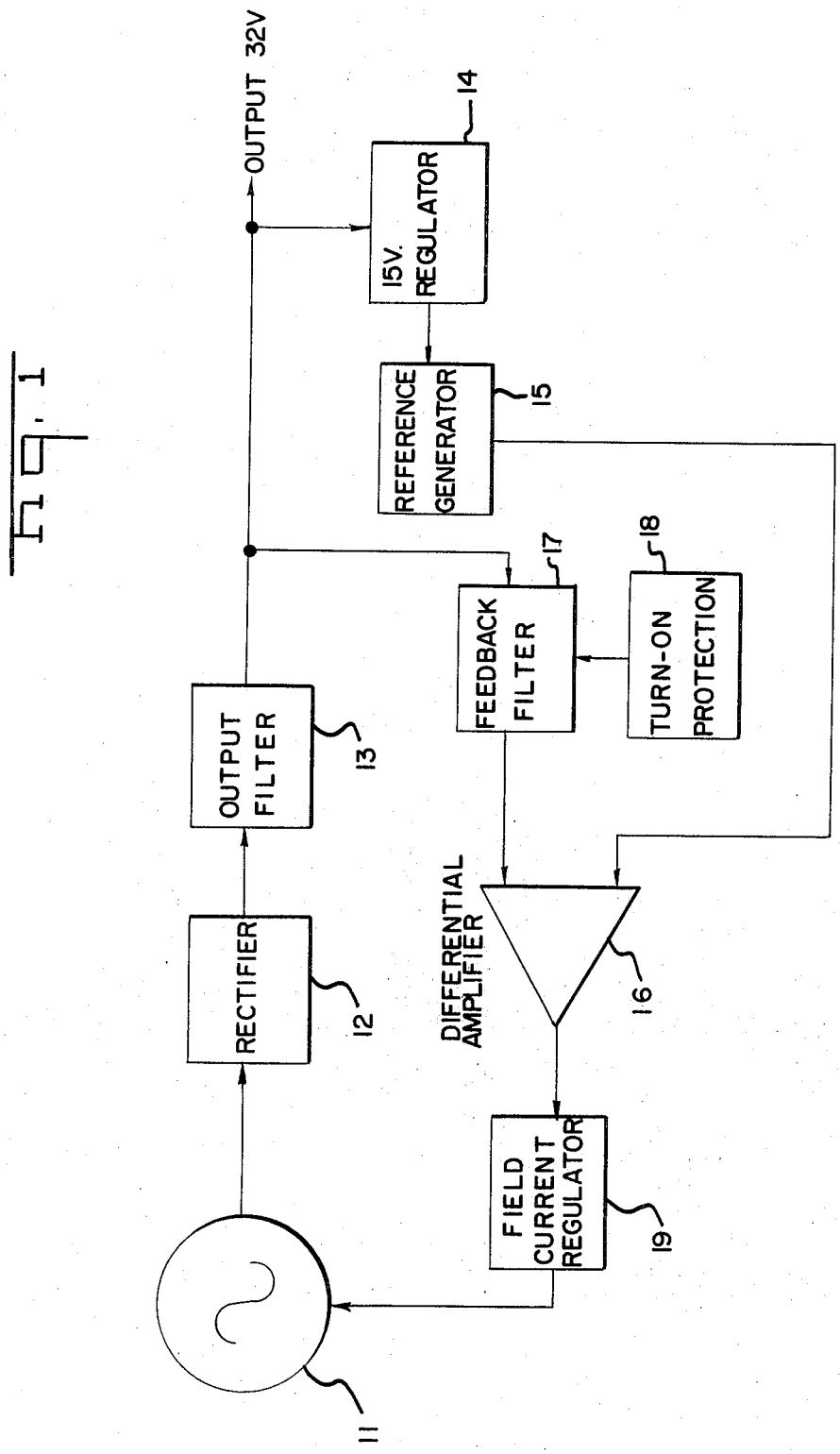

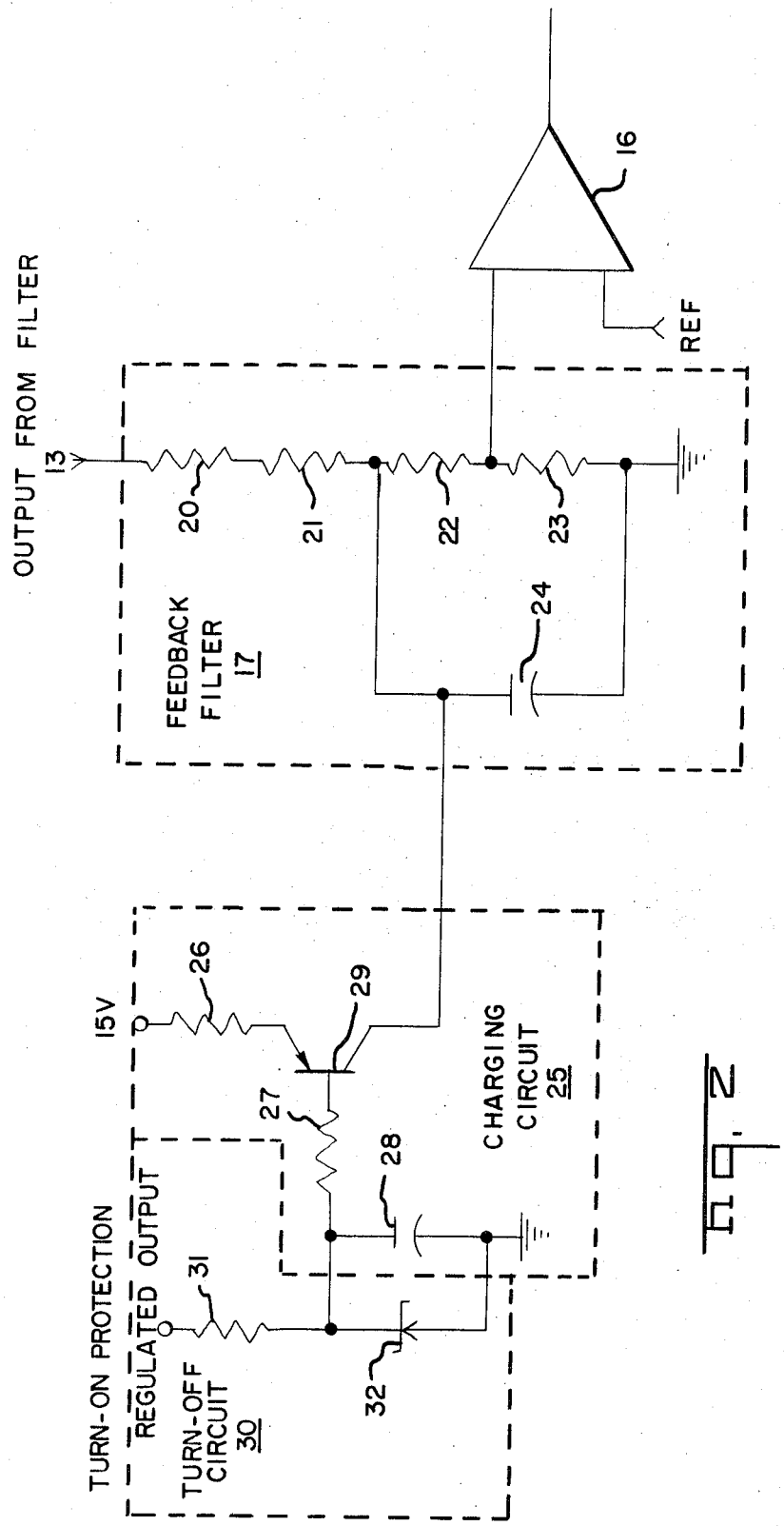

REGULATOR TURN-ON OVERSHOOT ELIMINATION

BACKGROUND OF THE INVENTION

This invention relates to voltage and current regulators and more particularly to an improvement for preventing overshoot in the regulated output upon startup of the generator.

A voltage or current regulator has feedback from the output of the generator. The regulated output is compared to a reference in the feedback amplifier. The feedback amplifier controls the alternator so that its output is well regulated. The feedback loop normally includes a feedback filter which eliminates ripple in the feedback voltage thereby preventing unstable regulation. Where the feedback filter includes capacitance, there is a problem upon startup. Under certain starting conditions the time lag introduced by the capacitance in the feedback filter allows the regulated output voltage to rise to an exceedingly high level. This has resulted in destruction of the regulator components before the feedback amplifier gains control.

The regulator described herein has particular applicability to the alternator used to supply voltage to a logging-while-drilling tool. Such a system is described in copending application Ser. No. 213,016 — Patton, "Method of an Apparatus for Logging-While-Drilling". Such a system is often started up while the logging tool is deep in a well. It is particularly critical that the startup be accomplished with minimum possibility of generator failure due to component destruction.

SUMMARY OF THE INVENTION

In accordance with this invention a variable current generator controlled by an auxiliary charging circuit supplies charging current to the capacitance in the feedback filter of a voltage regulator during startup of the system. This supplementary charging current precharges the feedback filter capacitance to a value equal to or in excess of its normal value during regulation. This prevents overshoot in the regulated output voltage which would otherwise be brought about because the regulated voltage applied to the feedback amplifier is very much below a reference voltage until the feedback filter capacitance is charged.

Accordingly, it is an important object of this invention to prevent voltage overshoot during startup of the voltage generator.

The foregoing and other objects, features and advantages of the invention will be better understood from the following more detailed description and appended claims.

DESCRIPTION OF THE DRAWINGS

FIG. 1 shows a block diagram of a voltage regulator;

FIG. 2 shows the circuit of this invention; and

FIGS. 3A–3D are waveforms depicting the operation.

DESCRIPTION OF A PARTICULAR EMBODIMENT

Figure 7A:
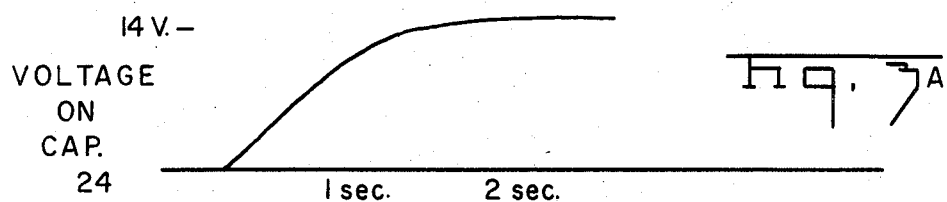
Figure 7B:
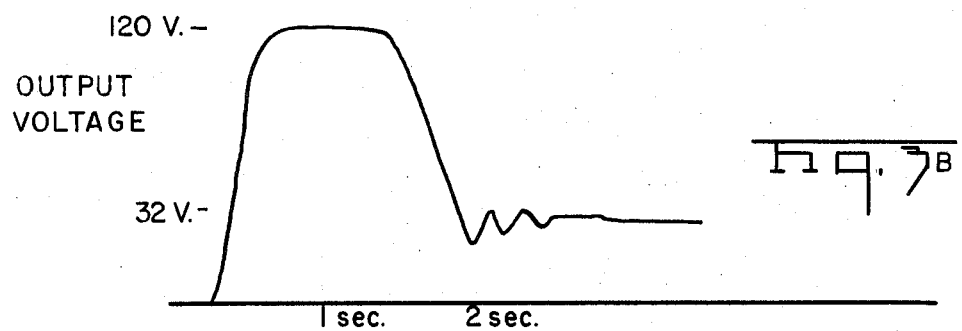
Figure 7C:
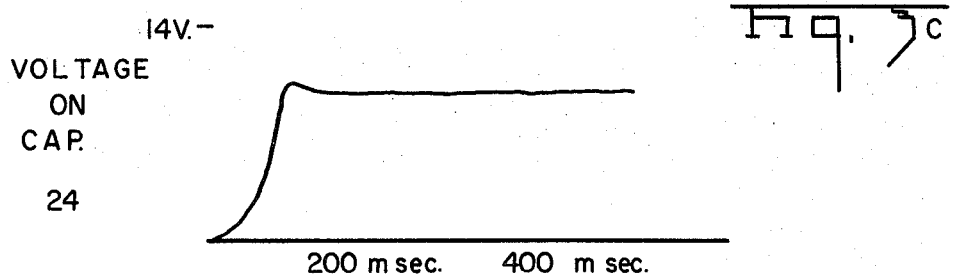
Figure 7D:
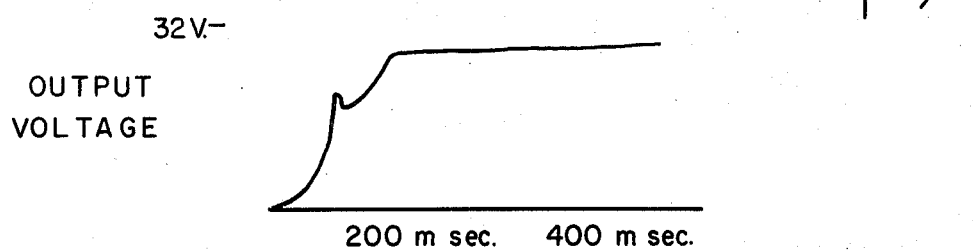

In FIG. 1 the primary generator is an alternator 11. The output of the alternator is rectified in rectifier 12 and filtered in the filter 13 to produce the regulated output voltage, which in the example being described is 32 volts. In order to generate a reference voltage, the output is applied to a 15 volt regulator 14. A reference voltage generator 15 generates the reference voltage which is connected to the differential amplifier 16 in the feedback loop. (Amplifier 16 may be considered to be a comparator amplifier.)

The feedback loop includes a feedback filter 17 which further smooths the ripple in the output voltage before it is applied to amplifier 16. The turn-on protection 18 of this invention controls the charging of the capacitance in the feedback filter 17 during startup.

Amplifier 16 compares the reference voltage to the regulated output. The output of amplifier 16 is applied to field current regulator 19 which regulates the alternator 11.

Referring to FIG. 2, the feedback filter 17 includes resistors 20–23 and the capacitance 24. A charging circuit 25 includes resistors 26 and 27, capacitor 28 and transistor 29. The turn-off circuit 30 includes resistor 31 and Zener diode 32.

The operation of the circuit is as follows. The charging circuit 25 charges the capacitance 24 in the feedback filter during turn-on according to the expression:

$$e_{c_2} \simeq \frac{1}{c_2} \int_0^t \frac{E_{G_1} \epsilon^{-\frac{t}{c_1(R_2 + \beta R_1)}}}{R_2 + \beta R_1} \beta dt$$

Where $\beta$ is the current gain of transistor 29

$e_{c_2}$ is the voltage across capacitance 24, $c_2$ is the capacitance 24, $E_{G_1}$ is the 15-volt source of charging current, $c_1$ is the capacitance of capacitor 28, $R_2$ is the resistance of resistor 27, and $R_1$ is the resistance of resistor 26.

Normally, the charging circuit for the feedback filter 17 without the auxiliary current source of this invention has a time constant of approximately 0.5 seconds, for the example being described. This causes a control lag of approximately 2 seconds before the amplifier 16 obtains control. However, the reference voltage generator 15 produces a reference voltage very much faster than this. Therefore, the feedback voltage applied to amplifier 16 is very much smaller than the reference voltage during startup. This causes the regulated output of the alternator 11 to grossly exceed the desired regulated value.

However, with this invention, the capacitance 24 is precharged during startup to a value equal to or in excess of the normal voltage on capacitor 24 during regulation. When the voltage on capacitor 24 reaches this value the turn-off circuit 30 cuts off transistor 29 thereby returning the feedback control circuit to its normal operation. At this time, the feedback voltage applied to amplifier 16 is substantially the normal value for proper regulated output while the actual regulator output is not yet up to normal. Therefore, the system normalizes with its standard time constant thereby preventing turn-on overshoot.

The resistor 31 carries further charging current from the regulated output thereby assuring that the charging circuit 25 remains cut off as long as the regulated output voltage is above 15 volts. The Zener diode 32 prevents the voltage on capacitor 28 from exceeding approximately 18 volts thereby protecting transistor 29 from voltage damage.

The operation of the circuit is depicted in the waveforms of FIGS. 3A–3D. FIG. 3A shows the voltage on capacitance 24 without this invention. It will be seen that it requires approximately two seconds to charge the capacitor to the normal control voltage. FIG. 3B shows the fluctuation in the regulated output voltage during this time. Large peaks in the output voltage during the first two seconds of startup can cause component damage.

On the other hand, with the precharging circuit of this invention, the voltage on capacitor 24 shown in FIG. 3C quickly reaches the control level. As a result, the output voltage, FIG. 3D, does not have the large fluctuations but rather quickly goes to the desired regulated output level of 32 volts. In the example being considered, the capacitor 28 is 10 microfarads whereas the feedback filter capacitance 24 is 300 microfarads.

In order to prevent overshoot in the output of the regulator on startup it is necessary that the feedback filter time constant be equal to or less than the time constant of the generator. In order to achieve this it requires effectively disabling the operating feedback charging circuit, (which has a long time constant compared to the generator), on startup and inserting a preconditioning circuit which charges filter capacitance 24 to a voltage equal to or slightly above its operating point and then return control to the operating feedback charging circuit.

The characteristics of the preconditioning circuit outlined above is accomplished by charging circuit 25. This is accomplished by applying the 15 volt supply of the regulator to the series charging circuit consisting of resistor 26, transistor 29 and filter capacitance 24. The values of resistors 26, 27 and the current gain of transistor 29 determine the maximum current applied to capacitor 24. If you consider the instant power is applied to the circuit transistor 29 is acting as a saturated switch or zero resistance and therefore at this moment only resistor 26 is limiting the current to capacitor 24. The circuit including resistor 27 and capacitor 28 determines the time that transistor 29 is conducting, therefore controlling the on time of the preconditioning circuit. As capacitor 28 becomes charged transistor 29 begins to limit the current applied to capacitance 24. When the voltage across capacitor 28 reaches 15 volts the transistor 29 turns off thereby returning control to the operating feedback filter. Resistance 27 and capacitor 28 are selected such that regulator output reaches its regulated value in an optimum time. The turn off circuit 30 consisting of resistance 31 and Zener diode 32 insure that capacitance 28 charges to a value greater than 15 volts thereby reverse biasing the base to emitter junction of transistor 29 insuring that the preconditioning circuit is disabled during normal operation.

The following component values are given by way of example only.

Resistors 20 and 21 — 3.5K
Resistors 22 and 23 — 2.75K
Capacitance 24 — 300 microfarads
Resistor 26 — 30 ohms
Resistor 27 — 2.5K
Capacitor 28 — 10 microfarads
Transistor 29 — 2N 2905
Resistor 31 — 50K
Zener diode 32 — 3–1N823

What is claimed is:

1. In a voltage regulator of the type including:
   a primary generator,
   a comparator amplifier for comparing a reference voltage to the output of said generator, the output of said comparator amplifier being applied to regulate said generator, and
   a feedback loop including a capacitor connected between the output of said primary generator and the input of said comparator amplifier, the improvement of a circuit for preventing overshoot in the output of said generator upon startup due to a time lag between the voltage at the output of said generator and the voltage at the input of said comparator amplifier caused by the time required to initially charge said capacitor comprising:
   means for supplying charging current to said capacitor to effectively reduce the time constant of said feedback loop during startup and to disable the normal function of said feedback loop, and
   a circuit for turning off said current supply means following startup to return normal function to said feedback loop to control said primary generator in reaching its regulated value.

2. The regulator recited in claim 1 wherein said means for supplying charging current includes a transistor having its emitter and collector connected between a source of charging current and the feedback loop capacitor, the base of said transistor being connected to said turn-off circuit.

3. The regulator recited in claim 2 wherein said circuit for turning said means for supplying charging current off includes a resistor connected between the output of said primary generator and the base of said transistor to turn off said transistor when said primary generator voltage reaches a predetermined value.

4. The regulator recited in claim 3 wherein said turn-off circuit includes a capacitor connected between the base of said transistor and the output of said primary generator.

5. The regulator recited in claim 4 wherein said turn-off circuit further includes a Zener diode connected across said capacitor to prevent the voltage on said capacitor from exceeding a predetermined level thereby protecting said transistor from voltage damage.

* * * * *

UNITED STATES PATENT OFFICE
CERTIFICATE OF CORRECTION

Patent No. 3,818,319        Dated June 18, 1974

Inventor(s) John W. Harrell, Bobbie J. Patton, and James H. Sexton

It is certified that error appears in the above-identified patent and that said Letters Patent are hereby corrected as shown below:

Column 1, line 27, "copending application Ser. No. 213,016 — Patton," should read
-- U. S. Patent No. 3,789,355
to Bobbie J. Patton, --.

Signed and sealed this 29th day of October 1974.

(SEAL)
Attest:

McCOY M. GIBSON JR.
Attesting Officer

C. MARSHALL DANN
Commissioner of Patents